United States Patent
Haslam et al.

(10) Patent No.: US 7,565,355 B1
(45) Date of Patent: Jul. 21, 2009

(54) MERGING FILE SYSTEMS DURING A DISK CLONE OPERATION

(75) Inventors: Andrew P. Haslam, Auckland (NZ); Andrew L. Paxie, Auckland (NZ); Nigel Pattinson, Auckland (NZ)

(73) Assignee: Symantec Corporation, Mountain View, CA (US)

( * ) Notice: Subject to any disclaimer, the term of this patent is extended or adjusted under 35 U.S.C. 154(b) by 509 days.

(21) Appl. No.: 10/741,046

(22) Filed: Dec. 18, 2003

(51) Int. Cl.
- *G06F 17/30* (2006.01)
- *G06F 7/00* (2006.01)
- *G06F 12/00* (2006.01)

(52) U.S. Cl. ............... 707/10; 707/204
(58) Field of Classification Search ............... 707/2
See application file for complete search history.

(56) References Cited

U.S. PATENT DOCUMENTS

| | | | |
|---|---|---|---|
| 7,174,352 B2 * | 2/2007 | Kleiman et al. | 707/203 |
| 2002/0103818 A1 * | 8/2002 | Amberden | 707/205 |
| 2003/0195903 A1 * | 10/2003 | Manley et al. | 707/201 |
| 2003/0217082 A1 * | 11/2003 | Kleiman et al. | 707/204 |
| 2005/0060372 A1 * | 3/2005 | DeBettencourt et al. | 709/206 |
| 2006/0173956 A1 * | 8/2006 | Ulrich et al. | 709/203 |

\* cited by examiner

*Primary Examiner*—John R Cottingham
*Assistant Examiner*—Kimberley Lovel
(74) *Attorney, Agent, or Firm*—Fenwick & West LLP

(57) ABSTRACT

A cloning manager reads contents of a source file system as a stream of objects. The cloning manager identifies a destination file system into which to merge the source file system stream during the cloning operation. The cloning manager proceeds to merge objects of the source file system stream into the destination file system according to a specific merging strategy, replacing some or all corresponding objects in the destination file system with their counterpart objects from the source file system stream, or preserving corresponding objects in the destination by discarding their counterpart objects from the source, as desired.

18 Claims, 4 Drawing Sheets

MERGING FILE SYSTEMS DURING A DISK CLONE OPERATION

TECHNICAL FIELD

This invention pertains generally to computer file system operations, and more specifically to merging file systems during disk cloning operations.

BACKGROUND ART

Various utilities exist today that allow merging of files and directories within an existing file system. Operating systems such as Microsoft Windows® and UNIX® provide file and directory manipulation utilities, such as shell programs to copy, move, and rename files and directories. Proprietary systems are also on the market that facilitate file system recovery and file system backup. All of these merging technologies require the presence of a file system that can act as an intermediary in the task of manipulating the underlying structures stored on physical media, on behalf of the requesting application.

Because merging as it exists in the prior art indirectly accesses physical media, each operation requires a non-trivial amount of setup overhead, resulting in inefficient file manipulation. This inefficiency is especially apparent when a large number of file transfer operations are executed. Furthermore, because the requesting application has no knowledge of the architecture of the underlying physical medium or the structure of the low level data laid out thereon, the file merging operations cannot easily be optimized to leverage specific attributes of the physical medium, nor do they necessarily have access to metadata concerning the data underlying the files and directories of the file system.

File system cloning software is also on the market today. During a file system clone, the data underlying an existing file system are examined at the physical media layout level, and a stream of objects is created representing that file system. A new file system is then created by initializing and modifying low level file system structures directly on a target physical medium. Because it operates at a lower level, a cloning operation is more efficient than file merging operations. Additionally, cloning operations can leverage knowledge of physical media architecture, and can access file system metadata.

Cloning is a destructive process, which destroys whatever content may happen to be in the target region of the physical media, by laying down a new file system thereon. Although cloning is an efficient way in which to create a new file system with the content and attributes of an existing one, as it exists in the prior art cloning cannot be used for non-destructive file manipulation operations on existing file systems.

What is needed are methods, computer readable media and systems that provide the efficiency and control over metadata and physical media of cloning, but that can be used to perform file manipulation operations on existing file systems, as merging utilities can.

DISCLOSURE OF INVENTION

The present invention comprises methods, systems, and computer readable media for merging file systems during a cloning operation. A cloning manager (101) reads the contents of a source file system (103) as a stream (107) of objects (109). The cloning manager (101) identifies a destination file system (105) into which to merge the source file system stream (107) during the cloning operation. The cloning manager (101) proceeds to merge objects (109) of the source file system stream (107) into the destination file system (105) according to a specific merging strategy. In some embodiments, the merging strategy comprises replacing corresponding objects (109) in the destination file system (105) with their counterpart objects (109) from the source file system stream (107). In other embodiments, the merging strategy comprises preserving corresponding objects (109) in the destination file system (105) by discarding their counterpart objects (109) from the source file system stream (107). In yet other embodiments, the merging strategy comprises replacing select corresponding objects (109) in the destination file system (105) with their counterpart objects (109) from the source file system stream (109), and preserving other corresponding objects (109) in the destination file system (105), as desired.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

Figure 1:
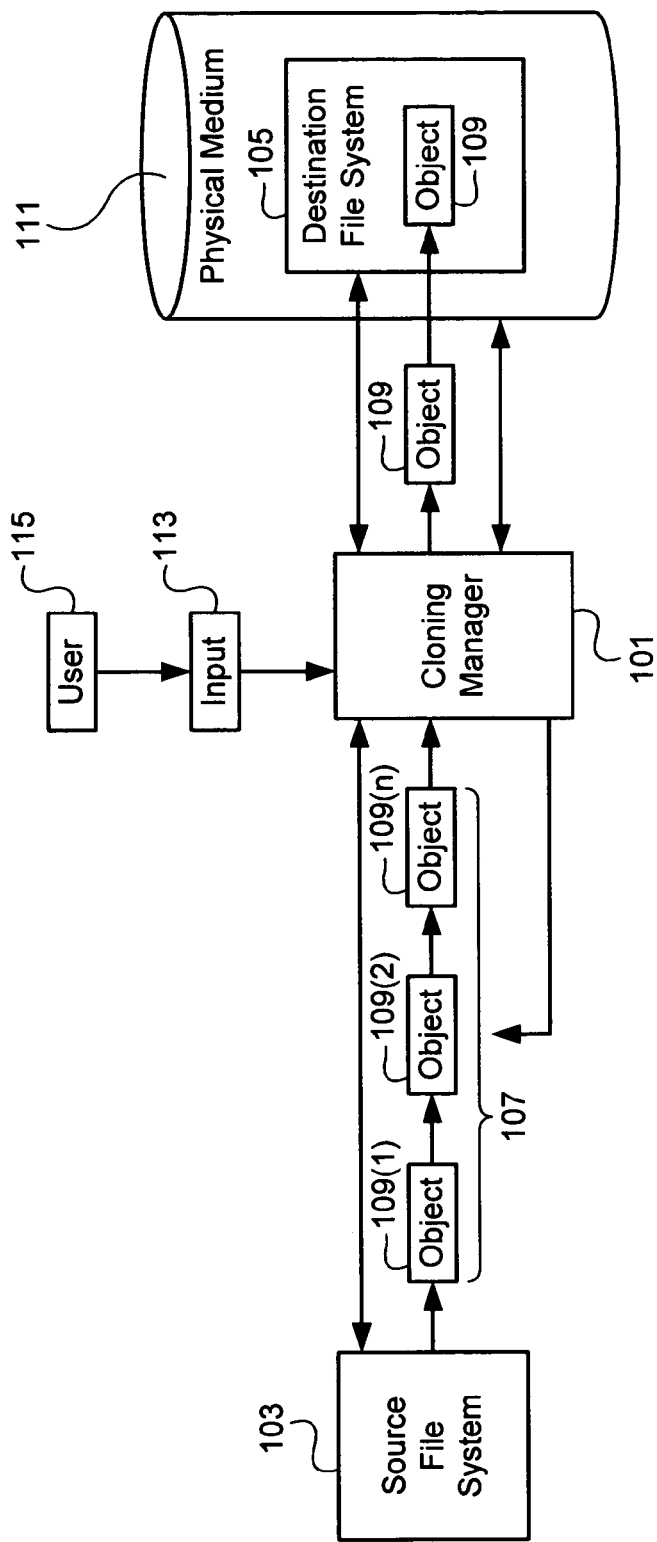
FIG. 1 is a block diagram illustrating a high level overview of a system for merging a source file system into an existing destination file system during a cloning operation, according to some embodiments of the present invention.

FIG. 1 illustrates a high level overview of a system 100 for performing some embodiments of the present invention. A cloning manager 101 merges a source file system 103 into an existing destination file system 105 during a cloning operation.

It is to be understood that although the cloning manager 101 is illustrated as a single entity, as the term is used herein a cloning manager 101 refers to a collection of functionalities which can be implemented as software, hardware, firmware or any combination of these. Where a cloning manager 101 is implemented as software, it can be implemented as a standalone program, but can also be implemented in other ways, for example as part of a larger program, as a plurality of separate programs, or as one or more statically or dynamically linked libraries.

It is to be understood that the locations of both the source 103 and destination 105 file systems can vary from embodiment to embodiment. For example, in some embodiments the source file system 103 resides on a first computer and the destination file system 105 resides on a second computer, where the two computer are communicatively coupled, e.g., by a network connection. In other embodiments, the source 103 and destination 105 file systems reside on the same computer, but on separate physical media 111. For example, the source file system 103 can reside on a primary storage medium and the destination file system 105 can reside on a backup medium (or vice versa). In other embodiments, the source 103 and destination 105 file systems reside on the same physical medium 111, for example in separate partitions.

As illustrated in FIG. 1, the cloning manager 101 reads contents of the source file system 103 as a stream 107 of objects 109. The implementation mechanics of constructing a stream 107 representing an existing file system will be apparent to those of ordinary skill in the relevant art in light of this specification. For example, in some embodiments the cloning manager 101 navigates the source file system 103 and builds the source file system stream 107 as a sequence of objects 109. Each object 109 in the stream 107 represents content of and/or metadata concerning at least one file and/or directory of the source file system 103. Metadata concerning a file and/or directory can comprise any information concerning the file and/or directory, for example data concerning file encryption and/or compression, ownership, access, permission or security information, modification history information, data concerning an underlying physical medium 111, data concerning hierarchy, or the status of a file or directory as system or hidden. Of course, other examples of metadata are also within the scope of the present invention, and will be apparent to those of ordinary skill in the relevant art in light of this specification.

It is to be understood that in some embodiments the cloning manager 101 creates the object stream 107 from the source file system 103 at a time significantly earlier than the updating of the destination file system 105. For example, in some embodiments the clone manager 101 reads the source file system 103 and creates all the objects 109 in object stream 107 before updating the destination file system 105. In other embodiments the object stream 107 is stored in secondary storage, for example as an image file. In yet other embodiments, the creation and processing of objects 109 is concurrent and can but need not utilize secondary storage such as an image file. So long as a given object 109 is created before it is consumed, an arbitrary non-negative number of unprocessed objects 109 may exist in the object stream 107.

The cloning manager 101 identifies an existing destination file system 105 into which to merge the source file system stream 107 during the cloning operation. Rather than destructively building a new file system on the destination medium 111, as per prior art cloning, the cloning manager 101 merges objects 109 of the source file system stream 107 into the destination file system 105 according to a merging strategy. The logistics of merging the source file system stream 107 into the destination file system 105 according to a merging strategy are discussed in greater detail below.

Various merging strategies can be selected, depending upon the desired result. For example, under some circumstances some (or even all) objects 109 in the source stream 107 will have corresponding objects in the destination file system 107 (e.g., a file with the same name at the same or a corresponding point in the file system hierarchy). The cloning manager 101 can replace corresponding objects 109 in the destination file system 105 with their counterpart objects 109 from the source file system 103, or preserve corresponding objects 109 in the destination file system 105 by discarding their counterpart objects 109 from the source stream 107, as desired. Alternatively, the cloning manager 101 can replace select corresponding objects 109 in the destination file system 105 with their counterpart objects 109 from the source stream 107, and preserve others. Which objects 109 to replace and which to preserve can be determined in various ways as desired, for example responsive to input 113 from a user 115, a user 115 provided list, a configuration file, a default setting, file system data or external information, e.g., from a centralized server computer. Additionally, the source 103 and destination 105 file systems, as well as the merge strategy to use, can be provided to the cloning manager 101 as user input 113, or in other ways (e.g., default setting(s), configuration file(s)), as desired.

Regardless of how the cloning manager 101 processes objects 109 in the source stream 107 that have corresponding objects 109 in the destination file system 103, the cloning manager merges objects 109 from the source stream 107 that do not have corresponding objects 109 in the destination file system 105 into the destination file system 105 by writing them to free space on a physical medium 111 associated therewith. This can comprise writing objects 109 containing file and/or directory content and/or associated metadata to the physical medium 111. Because the cloning manager 101 writes only to free space on the destination medium 111, the destination file system 105 is preserved. In other words, existing objects 109 in the destination file system 105 are preserved, unless a counterpart object 109 exists in the source stream 107, and it is desired that the corresponding object 109 in the destination file system 105 is replaced by its counterpart object 109 from the source 103.

Depending upon the format of the destination file system 105, in some embodiments the cloning manager 101 configures metadata attributes concerning at least some objects 109 of the destination file system 105 to correspond to metadata attributes concerning written objects 109 from the source file system stream 107. For example, in embodiments implemented in conjunction with NTFS, the cloning manager 101 can update the NTFS master file table to reflect metadata concerning objects 109 from the stream 107 written to the destination file system 105. In some embodiments, the cloning manager 101 modifies certain metadata attributes concerning objects 109 from the source file system stream 107 to comply with constraints imposed by the destination file system 105. For example, if the cloning manager is writing an object 109 based on a compressed file from the source file system 103 to a destination file system 105 that does not support such compression, the cloning manager 101 can decompress the data before writing it to the destination 105, and update the associated metadata accordingly.

Because the cloning manager 101 accesses the destination medium 111 directly, it can examine it prior merging the source stream 107 into the destination file system 105, and utilize information gleaned therefrom during the merge. In some embodiments, the cloning manager 101 examines the physical medium 111 associated with the destination file system 105, and merges the source file system steam 107 into the destination file system 105 so as to optimize usage of the physical medium 111. For example, the cloning manager 101 can lay down objects 109 from the source stream 107 so as to avoid fragmentation of the destination physical medium 111. In some embodiments, the cloning manager 101 verifies the integrity of the destination medium 111 before writing to it, and even fixes problems therewith if desired.

Other examples of actions that can be performed by the cloning manager 101 (utilizing the knowledge of the destination medium 111 or otherwise) in preparation for the cloning operation will be apparent to those of ordinary skill in the relevant art in light of this specification, and are within the scope of the present invention. For example, in some embodiments the cloning manager 101 deletes security descriptors of the destination file system 105, merges security descriptors from the source file system 103 and/or performs other housekeeping operations that will be apparent to those of ordinary skill in the relevant art in light of this specification, such that the destination file system 105 will be usable as desired after the cloning operation is complete.

Figure 2:
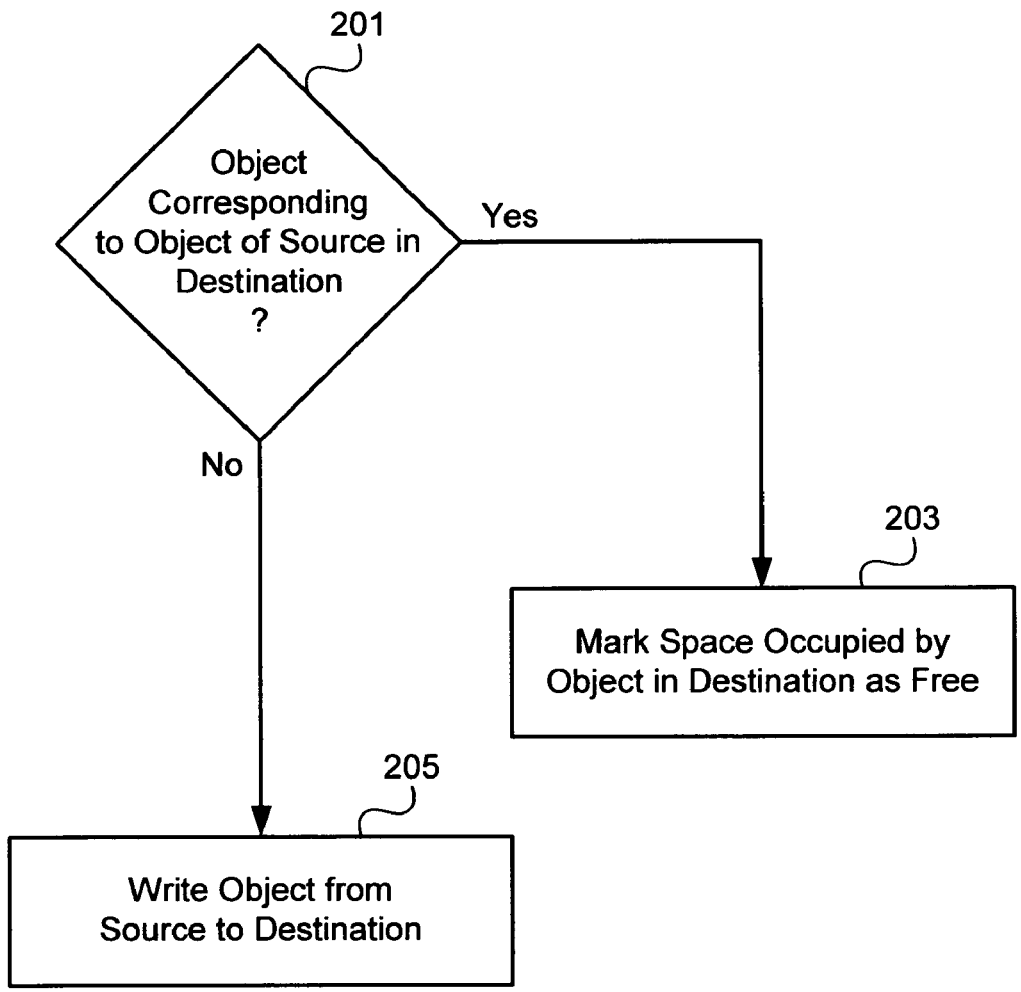
FIG. 2 is a flowchart illustrating steps for merging the source file system stream into the destination file system, according to an embodiment in which the merging strategy comprises replacing corresponding objects in the destination file system with their counterpart objects from the source file system stream.

Turning now to FIG. 2, the logistics of merging the source file system stream 107 into the destination file system 105 according to a merging strategy are discussed in greater detail. As illustrated in FIG. 2, in some embodiments in which the merging strategy comprises replacing corresponding objects 109 in the destination file system 105 with their counterpart objects 109 from the source file system stream 107, the cloning manager examines each object 109 from the stream 107, and determines 201 whether a counterpart object 109 already exists in the destination file system 105.

In one embodiment, if the cloning manager determines 201 that a corresponding object 109 exists in the destination file system 105, the cloning manager 101 marks 203 the space on the destination physical medium 111 occupied by the corresponding object 109 as being free space. The cloning manager 101 proceeds to write 205 the object 109 from the source stream 107 to the destination file system 105. Note that the cloning manager can but need not write 205 the object 205 to the free space it created during the marking 203 step. The cloning manager 101 can write 205 the object 109 from the source stream 107 to any available free space in the destination file system 105, as desired. In another embodiment (not illustrated), providing that the attributes of the source object 109 correspond to the attributes of the corresponding destination object 109, the cloning manager 101 reuses the space of the destination object 109, overwriting the data contained in the space with the data from the source object 109 and either a) discards any disk space not required to store the source object 109 (if the source object 109 is smaller than the destination object 109) or b) extends the space required to store the source object 109 (if the source object 109 is larger than the destination object 109). In both of the embodiments described above, where the cloning manager 101 determines 201 that no corresponding object 109 exists in the destination file system 105, the cloning manager simply writes 205 the object 109 from the source stream 107 to free space in the destination file system 105.

Figure 3:
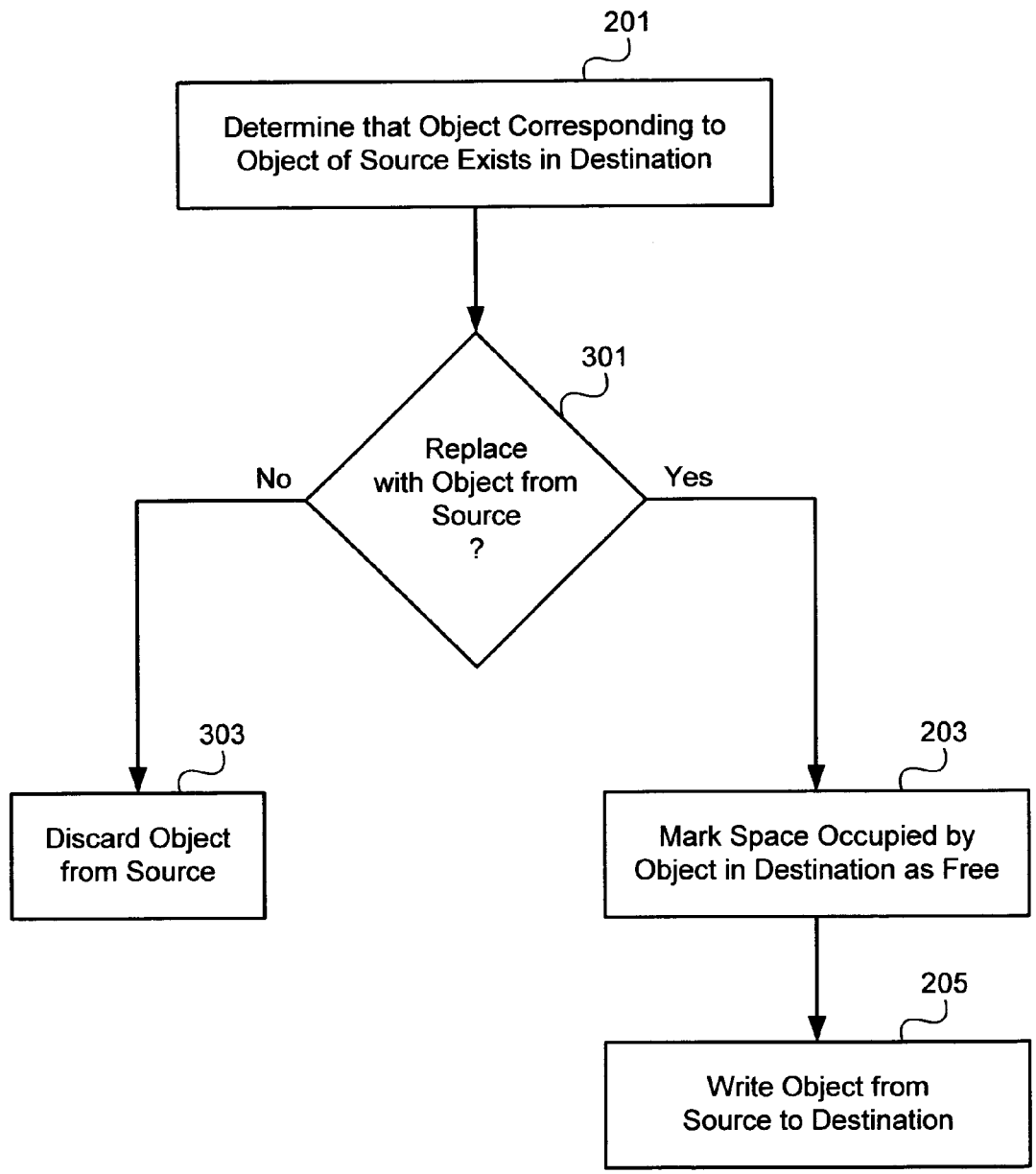
FIG. 3 is a flowchart illustrating steps for merging the source file system stream into the destination file system, according to an embodiment in which the merging strategy comprises replacing select corresponding objects in the destination file system with counterpart objects from the source file system stream.

FIG. 3 illustrates the logistics of merging the source file system stream 107 into the destination file system 105 according to some embodiments in which the merging strategy comprises replacing select corresponding objects 109 in the destination file system 105 with counterpart objects 109 from the source file system stream 107. The cloning manager 101 determines 201 that an object 109 exists in the destination file system that corresponds to an object 109 from the source file system stream 107. The cloning manager determines 301 whether to replace the corresponding object 109 in the destination file system 105 with its counterpart object from the source stream 107. This determination can be made according to various possible factors, as discussed in detail above.

Where the cloning manager 101 determines that the corresponding object 109 is to be replaced with its counterpart object 109 from the source stream 107, the cloning manager 101 either a) marks 203 the space occupied by the object 109 in the destination file system 105 as free, and writes 205 the object 109 from the source stream 107 to the destination file system, as described above or b) reuses the space and allocates or discards space as required. Where the cloning manager determines 301 that the corresponding object 109 in the destination file system 105 is not to be replaced, the cloning manager simply discards 303 the object 109 from the source stream 107, thereby preserving the corresponding object 109 in the destination file system 105. Note that where the cloning manager 101 determines that an object 109 in the source stream 107 does not have a corresponding object 109 in the destination file system 105, the cloning manager simply writes the object 109 from the source stream 107 to the destination file system 105, as described above and illustrated in FIG. 2.

Figure 4:
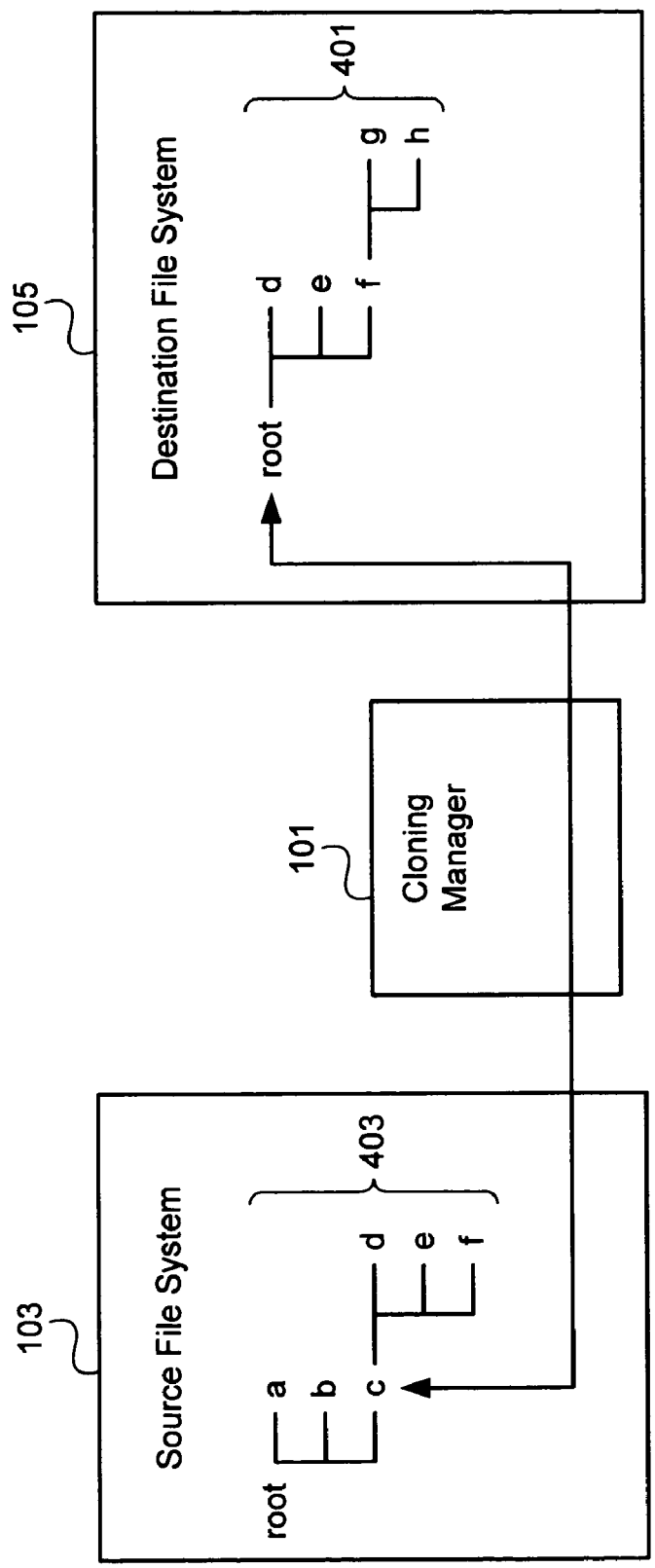
FIG. 4 is a block diagram, illustrating the cloning manager synchronizing a point in the source file system's hierarchy with a point in the destination file system's hierarchy, such that the merge of the source file system stream into the destination file system is synchronized between these two points, according to one embodiment of the present invention.

Turning to FIG. 4, in some embodiments of the present invention, the cloning manager 101 assumes the first object 109 in the source stream 107 is the root of the source file system 103, and merges the source file system stream 107 into the destination file system 105 accordingly, by starting the merge at the root of the destination file system 105, and moving down the hierarchy 401 of the destination file system in synchronization with the hierarchy 403 of the source file system 103, as the hierarchy 403 of the source file system 103 is represented in the objects 109 of the source stream 107. However, as illustrated in FIG. 4, the cloning manager 101 can synchronize any point in the source file system's hierarchy 403 with any point in the destination file system's hierarchy 401, such that the merge of the source file system stream 107 into the destination file system 105 is synchronized between these two points. Although these two points can be the respective roots (or some other common point) of the two file systems, they need not be. In other words, the cloning manager 101 can merge from any point in the source file system 103 to any point in the destination file system 105, and the two points can but do not have to be common. Additionally, the cloning manager can merge a subset or the entirety of the source file system 103 into the destination file system 105, as desired. The merge points as well as which parts of the source file system 103 to merge can be specified as user input 113, or gleaned by the cloning manager in other ways, for example from a configuration file, as default values, from an external source, etc.

Returning to FIG. 1, in some embodiments of the present invention, after the cloning manager 101 merges objects 109 of the source stream 109 into the destination file system 105, the cloning system performs house keeping operations on the destination file system 105, as desired. For example, the cloning manager 101 can verify and, if needed, patch the boot sector, ensure the integrity of volume and other system information, and otherwise configure the destination file system 105 as needed to allow post merging access thereto.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of these. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system, environment or file system. Accordingly, the disclosure of the present invention is intended to be illustrative, but not limiting, of the scope of the invention, which is set forth in the following claims.

What is claimed is:

1. A computer implemented method for merging file systems during a cloning operation, the method comprising the steps of:
   a cloning manager reading contents of a source file system as a stream of objects;
   the cloning manager identifying a destination file system into which to merge the source file system stream during the cloning operation; and
   the cloning manager merging objects of the source file system stream into the destination file system by replacing select corresponding objects in the destination file system with counterpart objects from the source file system stream, further comprising:
      the cloning manager determining whether objects corresponding to objects from the source file system stream exist in the destination file system;
      the cloning manager determining whether corresponding objects that exist in the destination file system are to be replaced with counterpart objects from the source file system stream responsive to a factor from a group of factors comprising:
         user input;
         a user provided list;
         a configuration file;
         a default setting;
         file system data; and
         external information;
      responsive to determining that a corresponding object exists in the destination file system, and that the corresponding object is to be replaced with a counterpart object from the source file system stream:
         the cloning manager marking the space occupied by the corresponding object in the destination file system as free space;
         the cloning manager determining a location on a physical medium associated with the destination file system, the location being able to hold the counterpart object without fragmenting the counterpart object;
         the cloning manager verifying the integrity of the location; and the cloning manager writing the counterpart object from the source file system stream to the location; and
      responsive to determining that a corresponding object exists in the destination file system, and that the corresponding object is not to be replaced with a counterpart object from the source file system stream, the cloning manager discarding the counterpart object from the source file system stream.

2. The method of claim 1 wherein the cloning manager merging objects of the source file system stream into the destination file system further comprises:
   the cloning manager writing at least one object from the source file system stream to a physical medium associated with the destination file system.

3. The method of claim 2 wherein the cloning manager writing an object from the source file system stream to a physical medium associated with the destination file system further comprises:
   the cloning manager writing at least one metadata attribute concerning content of the written object to the physical medium associated with the destination file system.

4. The method of claim 2 wherein the cloning manager writing an object from the source file system stream to a physical medium associated with the destination file system further comprises:
   the cloning manager configuring at least one metadata attribute concerning an object of the destination file system to correspond to at least one metadata attribute concerning the written object from the source file system stream.

5. The method of claim 2 wherein the cloning manager writing an object from the source file system stream to a physical medium associated with the destination file system further comprises:
   the cloning manager modifying at least one metadata attribute concerning an object from the source file system stream to comply with constraints imposed by the destination file system.

6. The method of claim 3, claim 4 or claim 5 wherein at least one metadata attribute comprises a metadata attribute from a list of metadata attributes consisting of:
   an encryption attribute;
   a compression attribute;
   a security attribute;
   an ownership attribute;
   access permission data;
   modification data;
   physical media data;
   hierarchy data;
   system status; and
   visibility status.

7. The method of claim 1 further comprising the steps of:
   the cloning manager navigating the source file system; and
   the cloning manager building the source file system stream, the source file system stream comprising a sequence of objects representing contents of and metadata concerning files and directories of the source file system.

8. The method of claim 1 further comprising the step of:
   the cloning manager synchronizing a point in the source file system's hierarchy with a point in the destination file system's hierarchy, such that the merge of the source file system stream into the destination file system is synchronized between these two points.

9. The method of claim 1 wherein the cloning manager merging objects of the source file system stream into the destination file system further comprises:
   the cloning manager merging a subset of the source file system stream into the destination file system.

10. The method of claim 1 wherein the cloning manager merging objects of the source file system stream into the destination file system further comprises:
    the cloning manager merging the entire source file system stream into the destination file system.

11. The method of claim 1 wherein the cloning manager receives as user input at least one item from a list of items consisting of:
- the source file system;
- the source file system stream;
- the merging strategy;
- the destination file system;
- at least one merge point; and
- a part of the source file system to merge.

12. The method of claim 1 further comprising the step of:
the cloning manager configuring the destination file system to allow access thereto, after merging the source file system stream into the destination file system.

13. The method of claim 1 further comprising the steps of:
the cloning manager examining a physical medium associated with the destination file system; and
the cloning manager verifying the integrity of the physical medium, prior to merging the source file system stream into the destination file system.

14. The method of claim 13 further comprising the step of:
responsive to the cloning manager discovering a problem concerning the physical medium associated with the destination file system, the cloning manager correcting the discovered problem prior to merging the source file system stream into the destination file system.

15. The method of claim 1 wherein the cloning manager merging objects of the source file system stream into the destination file system further comprises:
responsive to determining that a corresponding object exists in the destination file system, the cloning manager reusing space occupied by the corresponding object, overwriting data contained in the space with data from the counterpart object from the source file system stream.

16. The method of claim 15 wherein the cloning manager reusing space occupied by the corresponding object further comprises:
responsive to the counterpart object being smaller than the corresponding object, the cloning manager discarding any disk space not required to store the counterpart object.

17. The method of claim 15 wherein the cloning manager reusing space occupied by the corresponding object further comprises:
responsive to the counterpart object being larger than the corresponding object, the cloning manager extending the space required to store the counterpart object.

18. A computer readable storage medium containing a computer program product for merging file systems during a cloning operation, the computer program product comprising:
program code for reading contents of a source file system as a stream of objects;
program code for identifying a destination file system into which to merge the source file system stream during the cloning operation; and
program code for merging objects of the source file system stream into the destination file system by replacing select corresponding objects in the destination file system with counterpart objects from the source file system stream, further comprising:
determining whether objects corresponding to objects from the source file system stream exist in the destination file system;
determining whether corresponding objects that exist in the destination file system are to be replaced with counterpart objects from the source file system stream responsive to a factor from a group of factors comprising:
user input;
a user provided list;
a configuration file;
a default setting;
file system data; and
external information;
responsive to determining that a corresponding object exists in the destination file system, and that the corresponding object is to be replaced with a counterpart object from the source file system stream:
marking the space occupied by the corresponding object in the destination file system as free space;
determining a location on a physical medium associated with the destination file system, the location being able to hold the counterpart object without fragmenting the counterpart object;
verifying the integrity of the location; and
writing the counterpart object from the source file system stream to the location; and
responsive to determining that a corresponding object exists in the destination file system, and that the corresponding object is not to be replaced with a counterpart object from the source file system stream, discarding the counterpart object from the source file system stream.

\* \* \* \* \*